United States Patent [19]

Huff

[11] Patent Number: 5,797,992
[45] Date of Patent: Aug. 25, 1998

[54] METHOD FOR ENVIRONMENTAL TREATMENT OF HEAVY METALS

[76] Inventor: Carl L. Huff, 6969 Hollister, #603, Houston, Tex. 77040

[21] Appl. No.: 752,054

[22] Filed: Nov. 19, 1996

[51] Int. Cl.⁶ .............................. B08B 7/00; B08B 15/00
[52] U.S. Cl. .................... 134/7; 134/2; 134/6; 134/38; 451/38; 451/39; 588/236; 588/249; 588/256
[58] Field of Search ........................ 134/7, 6, 2, 38; 588/256, 249, 260, 231, 236; 451/37–39

[56] References Cited

U.S. PATENT DOCUMENTS

| | | | |
|---|---|---|---|
| 5,152,836 | 10/1992 | Hirano et al. | 106/690 |
| 5,162,600 | 11/1992 | Cody et al. | 588/236 |
| 5,233,796 | 8/1993 | Mazalewski, Jr. | 134/84 |
| 5,248,342 | 9/1993 | Montgomery et al. | 134/7 |
| 5,266,122 | 11/1993 | Rapp et al. | 134/7 |
| 5,338,356 | 8/1994 | Hirano et al. | 106/690 |
| 5,372,650 | 12/1994 | Lahoda et al. | 134/38 |
| 5,512,702 | 4/1996 | Ryan et al. | 588/249 |
| 5,527,982 | 6/1996 | Pat et al. | 588/256 |
| 5,637,355 | 6/1997 | Stanforth et al. | 134/7 |

OTHER PUBLICATIONS

Lewicke. Eniron. Sci. Technol., vol. 6 pp. 321–322 (1972).
Yang, J. Hazard. Mater. vol. 34, No. 2, pp. 235–243 (1993).

*Primary Examiner*—Jan Ludlow
*Attorney, Agent, or Firm*—Jackie Lee Duke

[57] ABSTRACT

An improved method for decontamination of lead contaminated surface coatings utilizing calcium phosphate minerals. The method for decontamination of lead contaminated surface coatings uses solid calcium phosphate material added to the abrasive blasting media prior to the structure being abrasive blasted. After removal of the lead contaminated surface coating by abrasive blasting with the calcium phosphate—abrasive blasting media mixture, the blown down surface coating and calcium phosphate—abrasive blasting media mixture are left in-situ to allow a chemical reaction to occur which renders the lead immobile and biologically nonhazardous. The calcium phosphate can be in one of several forms which are readily available and inexpensive.

8 Claims, 1 Drawing Sheet

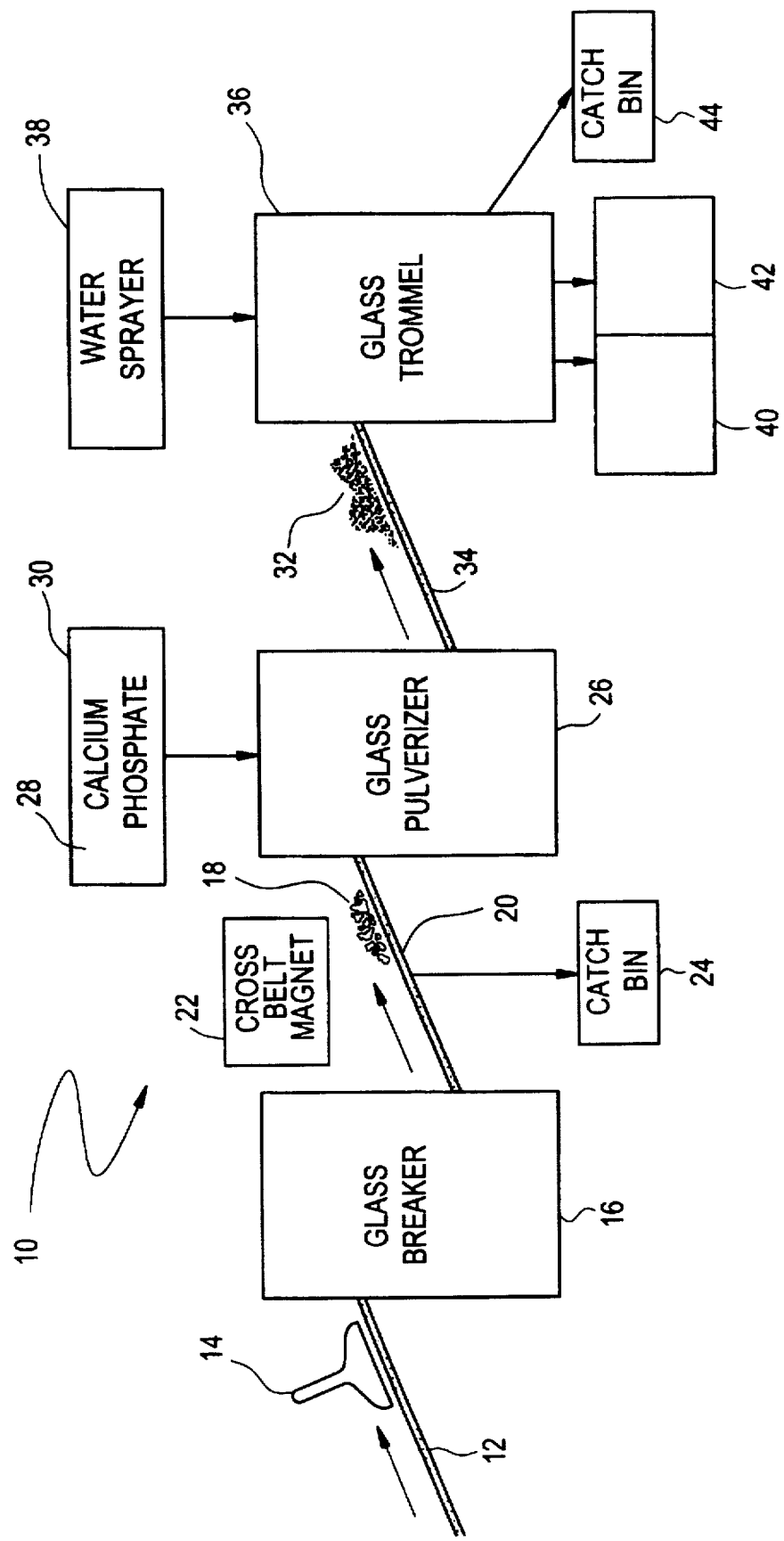

5,797,992

METHOD FOR ENVIRONMENTAL TREATMENT OF HEAVY METALS

BACKGROUND

This invention relates to a novel method and apparatus for environmental treatment of heavy metals, notably lead. More specifically the current invention relates to a technology for decontamination of lead found in surface coatings, such as paint, and cathode ray tube glass by treatment with calcium phosphate.

Lead is a heavy metal which is highly toxic to humans. Lead can be absorbed through the skin if a person comes in contact with a lead contaminated material such as paint. Additionally, lead can be ingested if it leaches into a water supply and the water is consumed. This type of contamination often occurs when lead contaminated materials are disposed of by dumping in unapproved dumpsites which lack the necessary safeguards to ensure the lead does not leach into the ground and attendant water table.

Many industrial structures such as bridges and piping are coated with rust inhibiting surface coatings or paint which contain lead. These coatings are intended to minimize the deleterious effects of rust and corrosion on these structures to ensure their structural integrity and pressure containment integrity. These industrial structures require periodic cleaning and reapplication of these rust inhibiting surface coatings. The first step in this process is removal of the old coating by abrasive blasting, commonly referred to as sand blasting. The problem associated with this type of operation is the blown down surface coating particles and abrasive particles are intermixed and lead contaminated. Some of this mixture is collected by a return line on the abrasive blasting nozzle to a receptacle while the remaining mixture falls on the ground. The problem with this of course is the need to collect this mixture of blown down surface coating particles and abrasive blasting particles before it can leach lead into the ground.

Due to the potential hazards to human health and the environment, the United States Environmental Protection Agency (hereinafter "U.S.E.P.A.") and state agencies have promulgated testing procedures to ascertain the amount of lead and other heavy metals in a given sample which could pose a health or environmental hazard. The standard test established by the U.S.E.P.A. is the Toxicity Characteristic Leaching Procedure (hereinafter "TCLP"). This test measures the amount of lead and other heavy metals released into the environment by water and other environmental factors acting on a given waste sample.

The U.S.E.P.A. has used these testing procedures to set limits on the amount of heavy metals which can be present in a given sample. These limits include: lead (5.0 mg/l); cadmium (1.0 mg/l); and chromium (5.0 mg/l). The U.S.E.P.A. and state environmental agencies sets limits on these and other heavy metals for the protection of public health and the environment.

As noted above, when the abrasive blast residue contains lead contaminated surface coating the problem of what to do with this lead contaminated residue is quite problematic. To date the typical method for treatment of this hazardous waste is to collect the material and cart it off to an U.S.E.P.A. approved disposal site. These disposal sites are essentially concrete lined pits into which the still toxic residue is dumped. This method is very expensive in terms of labor costs in gathering and hauling the lead contaminated residue and associated costs in obtaining governmental approval to haul and dispose of the lead contaminated residue.

One prior art method for handling such lead contaminated surface coatings is shown in U.S. Pat. No. 5,266,122 (Rapp et al.) The method shown by Rapp involves the addition of abrasive unreacted hydraulic cement to abrasive blasting media. The mixture is then used to blast the contaminated surface coating from a structure. Water is added during the blasting operation to react with the cement and form a surficial silica gel which binds the particulates in a cementicious whole.

A similar problem is encountered in the disposal of cathode ray tube glass. The cathode ray tube which comprises a television screen or a computer monitor screen has a lead coating applied to its inner surface. This coating is necessary to protect viewers of the television or computer monitor from the emissions of the cathode ray tube within. The problem occurs when these cathode ray tubes have reached the end of their useful life and it is time for disposal. Previous methods of disposal have included treatment of television picture tubes by trisodium phosphate (Lewicke, C. K. Environ. Sci. Technol. 1972, 6, 321–322), an expensive and complex operation, or, more commonly, crushing and grinding the tubes into small pieces for disposal in an U.S.E.P.A. approved disposal site as previously described.

It has been noted in prior research that phosphate compounds have the potential to immobilize lead and render it harmless to humans. (Ma, Q. Y.; Logan, T. J.; Traina, S. J. Environ. Sci. Technol. 1995, 29, 1118–1126.) Additionally, U.S. Pat. No. 5,512,702 to Ryan et al. expands on this research and discloses a method of treating lead contaminated soil and waste by combining solid calcium phosphate with the lead contaminated soil or waste to render the lead environmentally nonhazardous. Consequently, while the use of phosphate compounds to decontaminate lead contaminated materials has been shown previously, none of the prior art methods offer the simple straight-forward methods and apparatus of the present invention without requiring extensive government approval.

SUMMARY

The current invention utilizes phosphate compounds to render lead contaminated surface coatings or lead contaminated cathode ray tube glass non-toxic to humans. According to the present invention, in a first embodiment lead contaminated surface coatings are decontaminated in-situ during their removal from industrial structures. Solid calcium phosphate material is added to the abrasive blasting media prior to the structure being abrasive blasted. After removal of the lead contaminated surface coating by abrasive blasting with the calcium phosphate—abrasive blasting media mixture, the blown down surface coating and calcium phosphate—abrasive blasting media mixture are left in-situ to allow a chemical reaction to occur which renders the lead immobile and biologically nonhazardous. The calcium phosphate can be in one of several forms which are readily available and inexpensive.

In a second embodiment of the invention, a commercially available glass breaking machine is used to break cathode ray tubes into pieces which are transportable by conveyor belt. The cathode ray tube pieces are transported along a conveyor belt to a glass pulverizing machine. As the cathode ray tube pieces are fed into the glass pulverizing machine, solid calcium phosphate is being added simultaneously to the glass pulverizing machine. The finely comminuted mixture of cathode ray tube glass and calcium phosphate in then transported by conveyor belt to a trommel where water is added to the mixture of cathode ray tube glass and calcium phosphate. The trommel separates and sizes the finished mixture for use as industrial aggregate.

The principal objects of the present invention are: to provide an improved method for removal and decontamination of lead contaminated surface coatings, such as paint, in such a way as to reduce the level of lead in the removed surface coating to an environmentally acceptable level; to provide an improved method of removal and decontamination of lead contaminated surface coatings which is effective and inexpensive; to provide an improved method and apparatus for treatment of lead contaminated cathode ray tube glass which reduces the level of lead in the glass to an environmentally acceptable level; and, to provide an improved method and apparatus for treatment of lead contaminated cathode ray tube glass which produces a commercially useable compound with an environmentally acceptable level of lead.

BRIEF DESCRIPTION OF THE DRAWINGS

These and other objects and advantages of the present invention are set forth below and further made clear by reference to the drawings, wherein:

FIG. 1 is a block diagram illustrating an improved method and apparatus for decontamination of lead contaminated cathode ray tube glass made in accordance with the principles of the present invention.

DESCRIPTION OF THE PREFERRED EMBODIMENTS

In the embodiment of the present invention for decontamination of lead contaminated surface coatings, such as paint, the first step is a determination of the lead content in the surface coating. This is done by removing a sample of the surface coating from the structure to be cleaned and analyzing the lead content by a method well known in the art. An example of this method is Method 3015, Total Lead, U.S.E.P.A. Report SW-846, Test Methods for Evaluating Solid Wastes, Physical/Chemical Methods, which is hereby incorporated by reference. Based on this chemical analysis, an appropriate amount of calcium phosphate material is added to the abrasive blasting media which is to be used. This calcium phosphate material can take any number of forms. Chief among these are naturally occurring apatite, synthetic hydroxyapatite, dibasic calcium phosphate and phosphate rock. In the preferred embodiment, a mixture of 15% by weight of calcium phosphate and 85% abrasive blast media is used. This mixture was found to decrease the amount of leachable lead to less than the U.S.E.P.A. limit of 5 ppm using the standard TCLP test. The percentage of calcium phosphate may be increased to 25% with a proportional decrease in the amount of leachable lead as shown in Table 1 but at an increased cost. The mixture of calcium phosphate and abrasive blasting media is then directed onto the structure by conventional abrasive blasting methods well known to those skilled in the art. The mixture of calcium phosphate, abrasive blasting media and removed surface coating are then left in-situ for a minimum of 24 hours. This allows time for a chemical reaction to occur which transforms the lead to a nontoxic form. The resultant mixture is classified as nonhazardous waste by the U.S.E.P.A. and can be left in-situ or removed for disposal in a nonhazardous waste site. Since this mixture is nonhazardous, it can be handled, transported and disposed of without requiring U.S.E.P.A. or state environmental agency permits. The efficacy of this embodiment is shown in Table 1 below which shows the lead content of various samples before and after treatment by this preferred embodiment.

The results of Table 1 were compiled using two different blast media to demonstrate the effectiveness of this treatment with different media. Test panels of hot rolled steel were thoroughly cleaned by abrasive blasting and then coated with two coats of lead-based paint. The test panels were then cured for 14 days at a temperature of 100° F. Test panels are then abrasive blasted to remove the lead-based paint. The spent abrasive and paint is tested for leachable lead by the Toxicity Characteristic Leaching Procedure (TCLP). These results are tabulated in Table 1.

TABLE 1

| Compound | Before Treatment | | After Treatment | |
|---|---|---|---|---|
| | Leachable Lead (ppm) | pH Result | Leachable Lead (ppm) | pH Result |
| Silica Sand with 25% Calcium Phosphate | 70.00 | 5.31 | 0.70 | 7.62 |
| Coal Slag with 15% Calcium Phosphate | 11.00 | 5.28 | 1.30 | 7.76 |
| Coal Slag with 25% Calcium Phosphate | 11.00 | 5.28 | 0.90 | 7.86 |

FIG. 1 shows a specific illustrative embodiment of the lead decontamination apparatus 10 in which the lead contaminated cathode ray tube glass would be treated. In accordance with this embodiment, a conveyor belt 12 carries cathode ray tubes 14 to a commercially available glass breaker 16, such as a Andela Model AGB-1 Glass Breaker manufactured by Andela Manufacturing Company. The cathode ray tubes are broken into pieces of approximately ¼" diameter. The cathode ray tube pieces 18 are then transported by conveyor belt 20 under a cross belt magnet 22 which removes the metal pieces from the conveyor belt 20 and drops them into catch bin 24. The cathode ray tube glass pieces 18 continue on conveyor belt 20 to commercially available glass pulverizer 26, such as an Andela Model GP-1LG manufactured by Andela Manufacturing Company. Simultaneously, calcium phosphate 28 is added in a one to one ratio with the cathode ray tube glass pieces 18 from a hopper 30 positioned above the glass pulverizer 26. The glass pulverizer 26 mixes and pulverizes the cathode ray tube glass pieces 18 and calcium phosphate 28 into a mixture with an average particle size of a grain of sand. The finely ground mixture of cathode ray tube glass and calcium phosphate 32 is then carried by conveyor belt 34 to glass trommel 36, such as an Andela Model ATROM-072. A fine spray of water is applied to the finely ground mixture of cathode ray tube glass and calcium phosphate 32 from water sprayer unit 38 positioned above glass trommel 36. The water spray aids in dust control and accelerating the chemical reaction between the lead in the cathode ray tube and the calcium phosphate. The glass trommel 36 separates and sizes the finely ground mixture of cathode ray tube glass and calcium phosphate 32 into receptacles 40 and 42. Depending on the size of the finely ground mixture of cathode ray tube glass and calcium phosphate 32, the mixture can be used for aggregate as used in road building or abrasive blasting media as shown in the first embodiment. Finally, a catch bin 44 receives oversize pieces which can be reprocessed again.

Samples of cathode ray tube glass processed by this embodiment were tested as described above for their lead content before and after processing. These results are shown in Table 2 below which demonstrates the amount of available lead in the processed mixture to be 3.31 mg/l, well below the U.S.E.P.A. limit of 5 mg/l.

TABLE 2

| Compound | Before Treatment | | After Treatment | |
|---|---|---|---|---|
| | Results (mg/l) | Detection Limit (mg/l) | Results (mg/l) | Detection Limit (mg/l) |
| Antimony (Sb) | <0.02 | 0.02 | <0.02 | 0.02 |
| Arsenic (As) | <0.01 | 0.01 | <0.01 | 0.01 |
| Barium (Ba) | 7.25 | 0.01 | 1.98 | 0.01 |
| Beryllium (Be) | 0.02 | 0.02 | 0.02 | 0.02 |
| Cadmium (Cd) | 0.01 | 0.01 | <0.01 | 0.01 |
| Chromium (Cr) | 0.02 | 0.02 | <0.02 | 0.02 |
| Lead (Pb) | 206.00 | 0.02 | 3.31 | 0.02 |
| Mercury (Hg) | <0.005 | 0.01 | <0.005 | 0.01 |
| Nickel (Ni) | 0.01 | 0.01 | 0.01 | 0.01 |
| Selenium (Se) | <0.05 | 0.05 | <0.05 | 0.05 |
| Silver (Ag) | <0.02 | 0.02 | <0.02 | 0.02 |
| Vandium Pentoxide ($V_2O_6$) | <0.05 | 0.05 | <0.05 | 0.05 |

The apparatus for my improved environmental treatment of heavy metals and the methods of its application will be readily understood from the foregoing description and it will be seen I have provided an improved apparatus and method for decontamination of lead contaminated surface coatings or lead contaminated cathode ray tube glass. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A method for in situ decontamination of lead contaminated surface coatings, comprising:

determining the amount of lead in a lead contaminated surface coating to be decontaminated, blending a mixture of an abrasive blasting media with an amount of calcium phosphate in sufficient concentration to react with the lead in said lead contaminated surface coating, abrasive blasting said lead contaminated surface coating from a coated surface with said mixture, allowing said calcium phosphate to react with said lead in said lead contaminated surface coating removed by abrasive blasting to render said lead immobile and biologically nonhazardous, and leaving said mixture of abrasive blasting media and calcium phosphate and the surface coating removed by said abrasive blasting in place.

2. A method for in situ decontamination of lead contaminated surface coatings according to claim 1 wherein:

said abrasive blasting media is sand.

3. A method for in situ decontamination of lead contaminated surface coatings according to claim 1 wherein:

said abrasive blasting media is glass beads.

4. A method for in situ decontamination of lead contaminated surface coatings according to claim 1 wherein:

said lead contaminated surface coating is paint.

5. A method for in situ decontamination of lead contaminated surface coatings according to claim 1 wherein:

said calcium phosphate is naturally occurring apatite.

6. A method for in situ decontamination of lead contaminated surface coatings according to claim 1 wherein:

said calcium phosphate is synthetic hydroxyapatite.

7. A method for in situ decontamination of lead contaminated surface coatings according to claim 1 wherein:

said calcium phosphate is dibasic calcium phosphate.

8. A method for in situ decontamination of lead contaminated surface coatings according to claim 1 wherein:

said calcium phosphate is phosphate rock.

* * * * *